E. J. VON HENKE.
ELECTRIC WELDING APPARATUS.
APPLICATION FILED OCT. 3, 1917.
1,267,480.
Patented May 28, 1918.
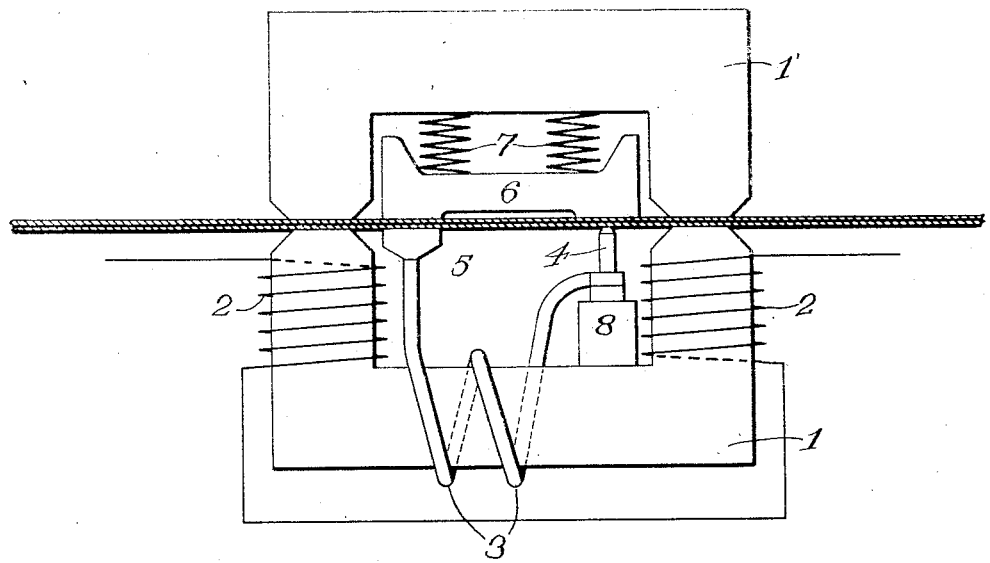
INVENTOR
Edmund J. Von Henke
BY
Townsend Decker
ATTORNEYS

UNITED STATES PATENT OFFICE.

EDMUND J. von HENKE, OF LYNN, MASSACHUSETTS, ASSIGNOR TO THOMSON SPOT WELDER COMPANY, OF BOSTON, MASSACHUSETTS, A CORPORATION OF MASSACHUSETTS.

ELECTRIC WELDING APPARATUS.

1,267,480.	Specification of Letters Patent.	Patented May 28, 1918.

Application filed October 8, 1917. Serial No. 195,270.

*To all whom it may concern:*

Be it known that I, EDMUND J. VON HENKE, a citizen of the United States, and a resident of Lynn, in the county of Essex and State of Massachusetts, have invented certain new and useful Improvements in Electric Welding Apparatus, of which the following is a specification.

My invention relates to an electric welding or riveting apparatus adapted for use upon plates, sheets or other forms of work having large superficial area.

One of the objects of my invention is to dispense with the necessity for using overhanging arms which, in those cases where the size of the work is large, are necessarily of great length in order to provide a work gap of the necessary extent suited to the work.

Another object of my invention is to provide apparatus suitable for use in positions where the work is disposed in a vertical plane and hence affords no support for said apparatus.

My invention is especially useful for welding or riveting operations performed upon ship plates when assembled in position in the ship structure and consists essentially in combining the electrodes and working parts of the apparatus with a suitable electro-magnet or magnets whose poles are adapted to engage and attach themselves to the work so as to hold the apparatus in position and enable the practical operations to be conducted from one side of the ship plate or other piece of work.

My invention consists further in the special combinations of devices and details of construction hereinafter described and then specified in the claims.

In the accompanying drawings I have shown in plan a typical form of apparatus embodying my invention and constructed with reference to the use of an electrode adapted for spot welding operations but, as will be readily understood by those skilled in the art, the form of the electrode and the details of the apparatus might be varied as may be desirable for other operations in which the heating effect of the electric current and pressure are employed, as for instance for riveting.

Referring to the drawings, the work is indicated in section as consisting of two plates superposed and overlapped upon one another. 1 1' indicates an iron core or mass of iron made in two parts applied respectively to the outer and inner surface of the work, said core being magnetically charged by means of a suitable coil or coils applied to one or both parts of the magnetic circuit constituted by them but preferably only to the one portion indicated by the numeral 1.

The charging coil, or primary, may derive current from any source. In one form of my invention, to wit that illustrated, said coil indicated at 2, may be the primary of the welding or riveting transformer and said part 1 may likewise be provided with a secondary winding 3 one terminal of which may be the spot welding or other electrode 4 used in the welding or riveting operation while the other terminal 5 is a plate or block of large surface adapted to engage the work by large superficial contact for the purpose of completing the circuit for the heating current through a block, bar or plate 6 on the reverse side of the work. The latter part 6 is suitably mounted upon the section 1' of the magnet core and is adapted to be held in firm contact with the work by said part 1', suitable springs 7 being preferably interposed between said bar and the carrier or support 1' therefor so as to assure a perfect contact of said bar with the work. As will be seen, the bar 6 is preferably enlarged opposite the terminal 5 and also preferably opposite the spot welding electrode 4 although enlargement at the latter point is not necessary since at this portion of the electric circuit the heating effects of said current are produced. The welding electrode 4 may be mounted upon a hydraulic or other pressure device indicated at 8 preferably mounted upon the section 1 of the magnet. The mechanical details of the latter appliance are not shown as they are well known in the art.

The apparatus is held to the side of the plate upon which the work is done by the strength of the magnetic attraction resulting from the flux circulating through the core 1, 1'. As this attraction is directly proportional to the square of the magnetic density at the gap, the iron core is reduced at the polar part engaging the work and as shown, while at the same time the rest of the circuit has the proper quantity of iron in the core to insure low magnetizing current.

As will be seen, all the operations of the electrical machinery in doing the work are confined to one side of the plate, the only attachment on the other side being the section 1' of iron and the copper block or plate carried thereby, the work itself serving the double purpose of conducting the magnetic flux for attachment of the apparatus and conducting the heating electric current used for the welding or riveting operation. The terminals 4 and 5 are proportioned as shown, for the following purpose, to wit: the total welding or heating current in the secondary being determined by the impedance of the secondary circuit, the heating will be the greatest at the point of greatest resistance; thus the heating will not be at the point where the secondary current passes through the plate constituting the work at the enlarged end of the secondary but will be where the comparatively small electrode 4 is placed, the latter electrode being operated as already indicated by some such means as hydraulic or pneumatic pressure or even by a magnet exerting its action through a toggle. The secondary winding described might be placed so that it can be moved laterally along the middle leg of the core 1, thereby enabling the production of several spot welds before the removal of the apparatus into a new position.

As will be seen from the foregoing description, the parts 1' and 6 serve mainly the purpose of closing respectively the magnetic and electric circuits for the apparatus located upon the opposite side of the work, the work itself conducting the magnetic flux and the electrical current as already stated.

What I claim as my invention is:—

1. In an apparatus for electric welding or riveting, an electro-magnet carrying working parts of said apparatus and adapted to engage and attach itself to the work for the purpose of holding the apparatus in working position.

2. In an apparatus for performing welding or riveting operations upon work vertically disposed, an electro-magnet whose poles are adapted to engage and attach themselves to the work combined with a current supplying electrode mounted on said magnet.

3. In an apparatus of the character described, a supporting electro-magnet carrying the working parts of the apparatus and having poles adapted to engage and attach themselves to the work upon one side thereof, combined with means upon the opposite side of the work for completing the magnetic and electrical circuits.

4. In an apparatus of the character described, an iron core made in two parts 1 1' adapted for application respectively to opposite sides of the work, one of said parts being wound with a magnetizing coil and having the working parts of the apparatus mounted upon it while the other of said parts carries a spring-pressed bar of good conducting material for completing the work circuit.

5. In an apparatus of the character described, a transformer having poles adapted to engage and attach themselves to the work as and for the purpose described.

6. In an apparatus of the character described, a transformer having poles adapted to engage and attach themselves to the work on one side thereof, combined with means upon the opposite side of the work for completing the electric and magnetic circuits of the transformer.

7. In an apparatus of the character described, the combination with a transformer, the magnetic circuit of which comprises a sectional core whose circuit is completed through the work, and a spring-pressed bar or plate of good conducting material mounted upon one of said sections for completing the electrical circuit of the secondary of said transformer.

8. In an apparatus of the character described, an electro-magnet made in sections adapted to be applied respectively to opposite sides of the work and to have the magnetic circuit completed through said work and means upon one of said sections for completing the electrical circuit for a working electrode carried by the opposite section.

9. In an apparatus of the character described, a transformer having a magnetic circuit formed by a sectional core the sections of which are adapted respectively for application to opposite sides of the work and have their magnetic circuit completed by the work and a secondary for said transformer having its electrical circuit in sections applied respectively to opposite sides of the work and completed therethrough.

Signed at New York, in the county of New York and State of New York this 6th day of October, A. D. 1917.

EDMUND J. von HENKE.

Witnesses:
F. B. TOWNSEND,
IRENE LEFKOWITZ.